(12) United States Patent
Hsuan-Chin

(10) Patent No.: US 8,328,285 B2
(45) Date of Patent: Dec. 11, 2012

(54) ADJUSTMENT STRUCTURE FOR CHAIR ARMREST

(75) Inventor: Tsai Hsuan-Chin, Chai-Yi Hsien (TW)

(73) Assignee: Fuh Shyan Co., Ltd., Chai-Yi Hsien (TW)

( * ) Notice: Subject to any disclaimer, the term of this patent is extended or adjusted under 35 U.S.C. 154(b) by 158 days.

(21) Appl. No.: 13/004,996

(22) Filed: Jan. 12, 2011

(65) Prior Publication Data

US 2012/0175933 A1    Jul. 12, 2012

(51) Int. Cl.
*A47C 7/54* (2006.01)
(52) U.S. Cl. .................................. 297/411.36
(58) Field of Classification Search .............. 297/411.36
See application file for complete search history.

(56) References Cited

U.S. PATENT DOCUMENTS

| | | | |
|---|---|---|---|
| 4,277,102 A * | 7/1981 | Aaras et al. ............. | 297/411.36 |
| 5,931,537 A * | 8/1999 | Gollin et al. ............. | 297/411.36 |
| 6,419,323 B1 * | 7/2002 | Chu et al. ................. | 297/411.36 |
| 6,733,080 B2 * | 5/2004 | Stumpf et al. ........... | 297/411.36 |
| 6,974,189 B2 * | 12/2005 | Machael et al. ......... | 297/411.36 |
| 7,055,910 B2 * | 6/2006 | Wright ................. | 297/411.36 X |
| 7,066,546 B2 * | 6/2006 | Trego et al. ........... | 297/411.36 X |
| 7,234,777 B2 * | 6/2007 | Schweikarth et al. ...................... | 297/411.36 X |
| 7,533,939 B2 * | 5/2009 | Fookes et al. ............ | 297/411.36 |
| 7,744,159 B2 * | 6/2010 | Lee ........................... | 297/411.36 |
| 7,770,979 B2 * | 8/2010 | He ............................ | 297/411.36 |
| 7,815,259 B2 * | 10/2010 | Fookes et al. ........ | 297/411.36 X |
| 7,828,389 B2 * | 11/2010 | Oda ........................ | 297/411.36 |
| 7,841,665 B2 * | 11/2010 | Geister et al. ............ | 297/411.36 |
| 7,896,440 B2 * | 3/2011 | Tsai ..................... | 297/411.36 X |
| 8,128,172 B2 * | 3/2012 | Tsai ........................ | 297/411.36 |
| 8,235,468 B2 * | 8/2012 | Fookes et al. ............ | 297/411.36 |
| 2007/0164595 A1 * | 7/2007 | Chi ........................... | 297/411.36 |
| 2008/0036265 A1 * | 2/2008 | Pan ......................... | 297/411.36 |
| 2012/0104823 A1 * | 5/2012 | Lai .......................... | 297/411.36 |

\* cited by examiner

*Primary Examiner* — Rodney B White
(74) *Attorney, Agent, or Firm* — Alan Kamrath; Kamrath IP Lawfirm, PA

(57) ABSTRACT

An adjustment structure of a chair armrest is provided. The armrest is attached to a chair back through a fastening seat. A releasable fastener provided between the armrest and the fastening seat allows the armrest to be slide vertically and get positioned with respect to the fastening seat. The fastening seat has a guiding groove facing the armrest and the guiding groove is formed with toothed portions. The releasable fastener includes an engaging member for bilaterally engaging with the toothed portions, mutually engageable slanting tooth portions formed on a lever and a driven member assembled to the armrest, respectively, and a screw passing through the engaging member and the guiding groove to be screwingly fixed to the driven member. By pulling the lever upward or downward, the armrest is released to be repositioned or is positioned so that the armrest attached to the chair back can be adjusted in altitude.

5 Claims, 5 Drawing Sheets

ADJUSTMENT STRUCTURE FOR CHAIR ARMREST

BACKGROUND OF THE INVENTION

1. Technical Field

The present invention relates to armrests attached to chair backs, and more particularly, to an adjustment structure for a chair armrest that allows the armrest to be adjustably positioned with respect to a chair back.

2. Description of Related Art

Office chairs usually have armrests provided at two sides of a seat portion thereof. On order to adapt the armrests to users' different arm positions, some existing chairs have their armrests adjustable in altitude. However, where the office chair has its chair back configured to be reclined independent of its seat portion, a user lying on the reclined chair back will have his/her arms moving toward the chair back and being away from the armrests. As a result, the armrests fail to function, namely to support the user's arms.

For ensuring that a user who is in either an upright position or a lying position can have his/her arms appropriately resting on the armrests, some chairs are made to have armrests directly attached to a chair back thereof, so that when the chair back reclines, the armrests move along with it, thereby allowing the user to rest his/her aims on the armrests readily despite his/her body posture.

Yet, in the existing designs, the armrests attached to the chair back are fixed with respect to the chair back and allow no adjustment in altitude. Thus, the existing designs lack for adaptability and fail to satisfy when users having various body heights. Since it is indeed advantageous to have armrests attached to a chair back in terms of the chair back's spatial applicability and functionality, it would be desirable to have a design where armrests attached to a chair back are adjustable in altitude.

SUMMARY OF THE INVENTION

Hence, for improving the existing designs wherein the armrests lack for adaptability in altitude, the present invention provides an adjustment structure that allows an armrest attached to a chair back to be adjusted in altitude, without adversely affecting spatial applicability and functionality of the chair back.

To this end, the adjustment structure of the present invention comprises a fastening seat and a releasable fastener provided between the chair back and the armrest, wherein the fastening seat is formed with a guiding groove for guiding the armrest when the armrest slides vertically, and the releasable fastener includes an engaging member provided at one side of the guiding groove, two mutually engageable slanting tooth portions provided on a lever and a driven member of the armrest, respectively, and a screw passing through the engaging member and the guiding groove to be fixed to the driven member.

In the foregoing scheme, the combining end of the armrest is configured to contact and closely meet the fastening seat.

In the foregoing scheme, a sliding member is attached to the combining end of the armrest. The sliding member allows the screw to pass therethrough and is configured to contact and closely meet the fastening seat. The sliding member has its middle portion formed with raised guiding portions for slidably engaging with the guiding groove.

In the foregoing scheme, the sliding member has two sides thereof closely meeting the fastening seat formed with resilient wings.

In the foregoing scheme, each of the guiding groove of the fastening seat and the engaging member is provided with a toothed portion and the toothed portions are engageable mutually.

By implementing the present invention, when pulled upward, the lever of the releasable fastener that connects the fastening seat and the armrest has its slanting tooth portion engaged with the slanting tooth portion of the driven member, so that the engaging member and the armrest are disengaged on the fastening seat, thereby allowing the armrest to be adjusted in altitude. When the lever is pulled downward, its slanting tooth portion pushes the slanting tooth portion of the driven member away, so that the engaging member and the armrest are engaged on the fastening seat, thereby positioning the armrest with respect to the fastening seat at a desired altitude. In such a way, an armrest attached to a chair back has adjustability in altitude.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

Figure 1:
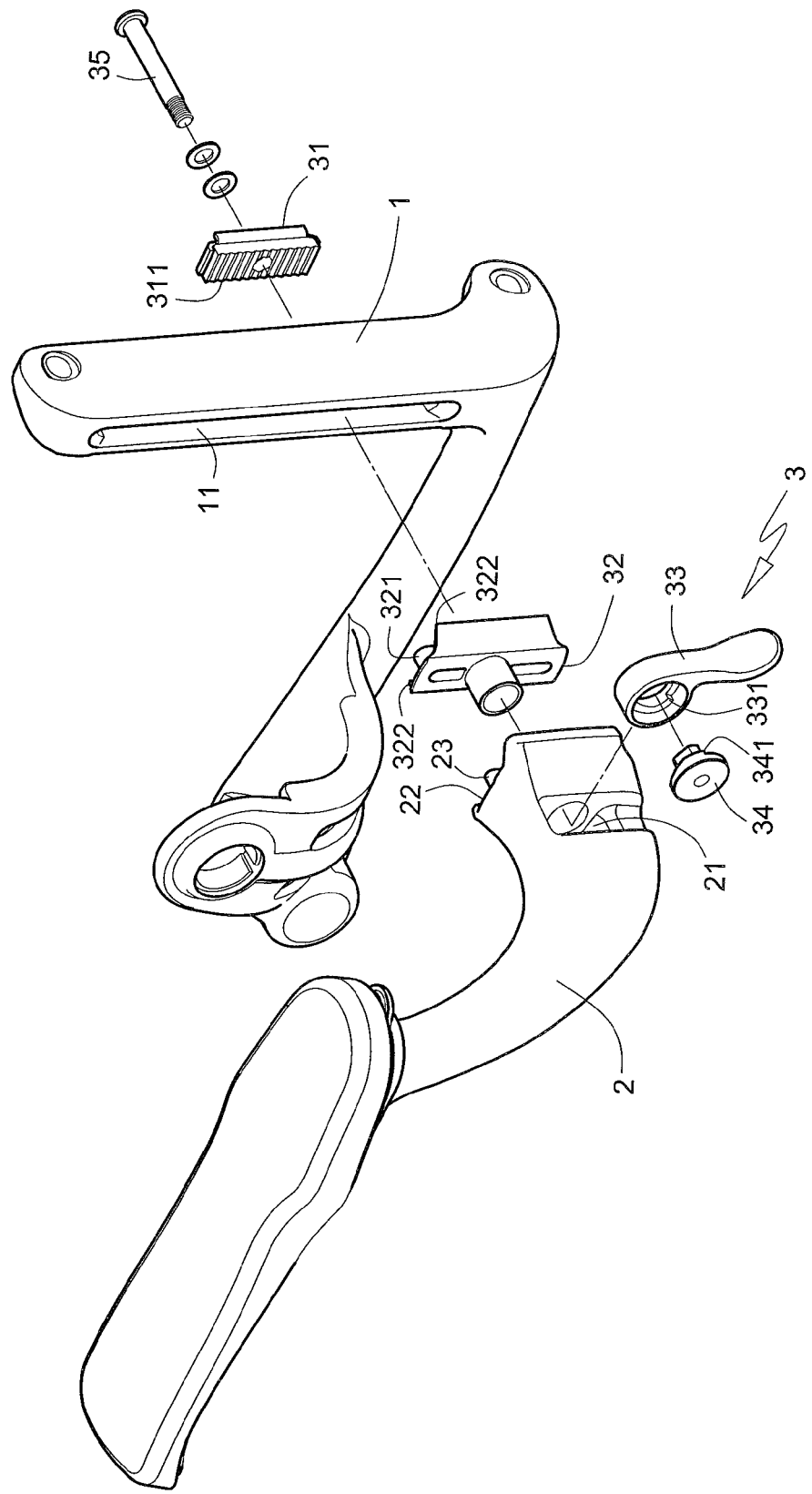
FIG. 1 is an exploded view of the present invention.
Figure 2:
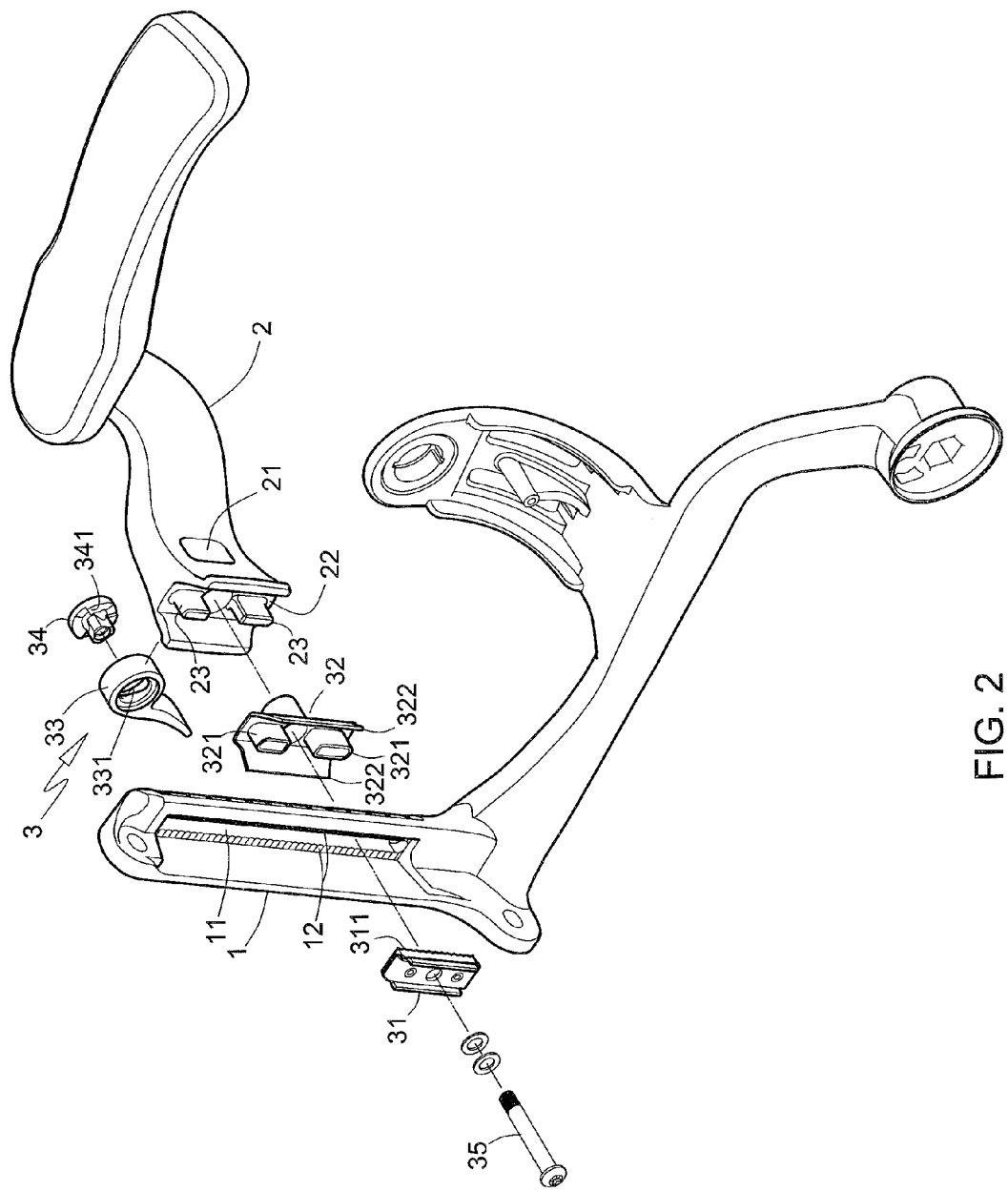
FIG. 2 is another exploded view of the present invention taken from a different viewpoint.

Referring to FIGS. 1 through 4, the present invention provides an adjustment structure including a fastening seat 1. The fastening seat 1 has its upper and lower ends fixed to a chair back of an office chair while having the rest parts thereof attached to a seat portion or a base and extended according to practical needs. An armrest 2 is mounted on the fastening seat 1 through a releasable fastener 3 so that the armrest 2 can vertically slide and be positioned. The fastening seat 1 is formed with a vertically extending guiding groove 11 and toothed portions 12 flanking the guiding groove 11.

On the other hand, the armrest 2 has a combining end 22 facing the fastening seat 1. The combining end 22 is terminally provided with raised engaging portions 23. The armrest 2 also has a recess 21 for accommodating a lever 33 and a driven member 34 of a releasable fastener 3. Between the lever 33 and the driven member 34, there may be continuous slanting tooth portions 331 and 341 for engaging with each other. An engaging member 31 having a toothed portion 311 is deposited in the guiding groove 11 of the fastening seat 1, so that the engaging member 31 can engage with the toothed portions 12 provided on the fastening seat 1.

Furthermore, a sliding member 32 having guiding portions 321 is attached to the combining end 22 of the armrest 2 such that the guiding portions 321 are received in the guiding groove 11 of the fastening seat 1 for guiding the armrest 2 when the armrest 2 moves vertically. The sliding member 32 is formed bilaterally with wings 322 that are resilient and fit the fastening seat 1, so that in virtue of the resilient pushing force of the wings 322, the armrest 2 normally tends to leave the fastening seat 1. A screw 35 passes through the engaging member 31, the guiding groove 11 and the sliding member 32 successively and then enters the armrest 2, so that the screw 35 has its terminal entering the recess 21, passing through the lever 33 and getting screwingly combined with the driven member 34. Also in virtue of the resilient pushing force of the sliding member 32, the slanting tooth portions 331 and 341 between the lever 33 and the driven member 34 are resiliently engaged with each other.

Figure 3:
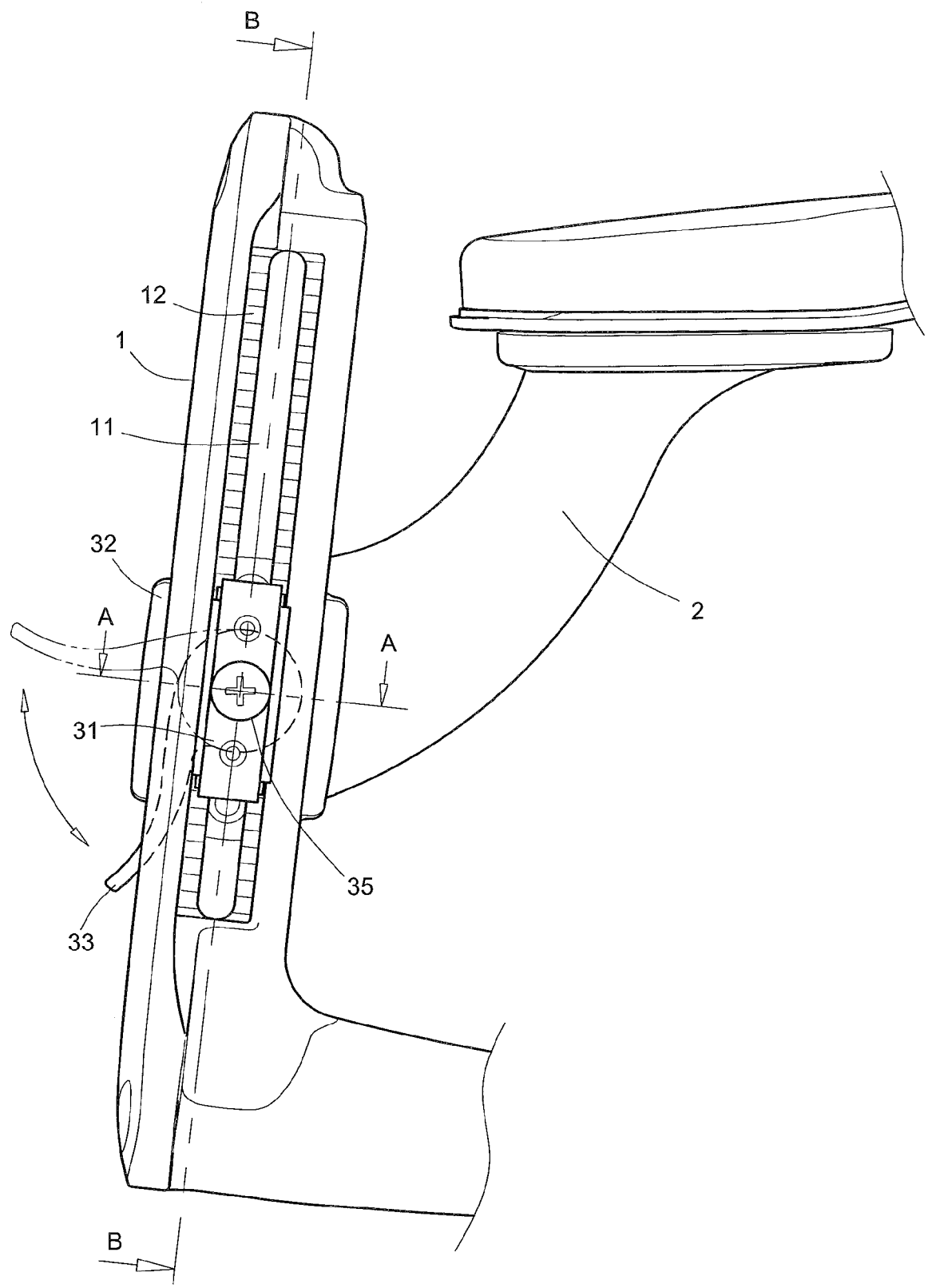
FIG. 3 is a side view of the present invention.
Figure 4:
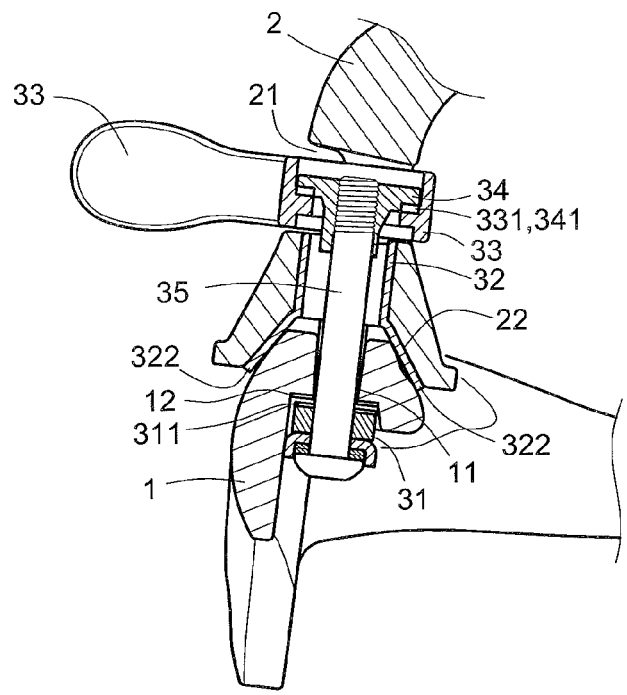
FIG. 4 is a cross-sectional view taken along Line A-A of FIG. 3.
Figure 6:
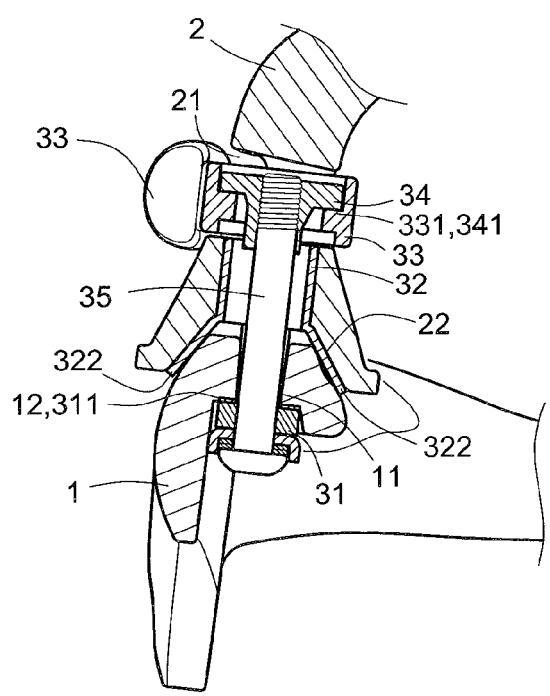
FIG. 6 is a schematic drawing showing the releasable fastener of the present invention fastened.
Figure 5:
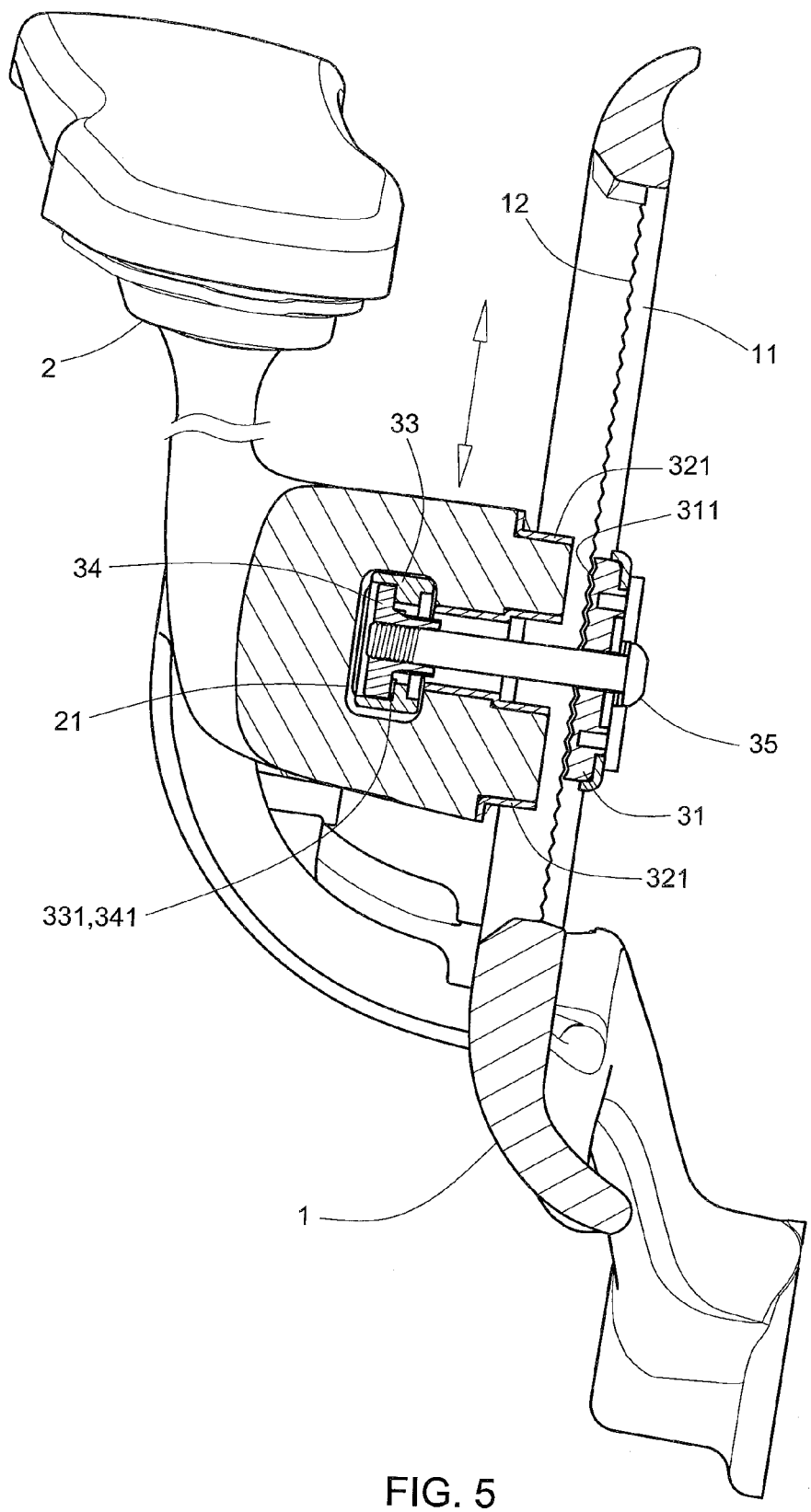
FIG. 5 is a cross-sectional view taken along Line B-B of FIG. 3.

Thereby, as shown in FIGS. 3 and 4, when the lever 33 is pulled upward, the slanting tooth portions 331 and 341 between the lever 33 and the driven member 34 are engaged with each other. Then, when the screw 35 is unscrewed toward the fastening seat 1, the engaging member 31 and the toothed portions 12 become mutually disengaged so as to allow the armrest 2 to vertically slide as shown in FIG. 5. Referring to FIG. 6, when the armrest 2 is positioned at a desired altitude, the lever 33 is pulled downward to make slanting tooth portions 331 and 341 of the lever 33 and the driven member 34 push each other away to pull the screw 35 toward the fastening seat 1, thereby pressing the engaging member 31 onto the toothed portions 12, and in turn positioning the entire armrest 2 with respect to the fastening seat 1.

Therefore, the releasable fastener 3 allows the armrest 2 to slide along the fastening seat 1 vertically and get positioned with respect to the fastening seat 1. In other words, the armrest 2 attached to the chair back is adjustable in altitude. Thereby, a user lying on the reclined chair back can have his/her arms appropriately supported by armrests positioned right in both angle and altitude.

Alternatively, the sliding member 32 formed on the combining end 22 of the armrest 1 may be omitted. In such a case, the combining end 22 is configured to be directly slidably coupled to the fastening seat 1 and its raised engaging portions 23 are configured to be right slidably received in the guiding groove 11 while the armrest 2 has two sides thereof providing similar resilient pushing force, so as to present the same function where the armrest is allowed to slide vertically and get positioned.

What is claimed is:

1. An adjustment structure for a chair armrest comprising a fastening seat, the chair armrest being attached to the fastening seat through a releasable fastener so that the armrest is allowed to slide vertically and get positioned, and the adjustment structure being characterized in:

the fastening seat formed with a guiding groove wherein the armrest is configured to slide along the guiding groove;

the armrest formed with a recess for accommodating the releasable fastener and provided with a combining end facing the fastening seat; and the releasable fastener composed of a lever and a driven member each having a continuous slanting tooth portion for engaging with the continuous slanting tooth portion of the other, an engaging member deposited in the guiding groove of the fastening seat, and a screw passing through the engaging member, the guiding groove, the combining end of the armrest and the lever to be screwingly coupled with the driven member.

2. The adjustment structure of claim 1, wherein the combining end of the armrest contacts and closely meets the fastening seat.

3. The adjustment structure of claim 1, wherein a sliding member is attached to the combining end of the armrest, the sliding member contacting and closely meeting the fastening seat, allowing the screw to pass therethrough, and having a raised guiding portion for slidably engaging with the guiding groove.

4. The adjustment structure of claim 3, wherein the sliding member has two sides thereof closely meeting the fastening seat formed with resilient wings.

5. The adjustment structure of claim 1, wherein each of the guiding groove of the fastening seat and the engaging member is provided with a toothed portion and the toothed portions are configured to engage with each other.

* * * * *